(12) United States Patent
Corry et al.

(10) Patent No.: US 8,341,637 B2
(45) Date of Patent: Dec. 25, 2012

(54) UTILIZATION MANAGEMENT

(75) Inventors: Kevin Michael Corry, Pflugerville, TX (US); Mark Alan Peloquin, Austin, TX (US); Steven Pratt, Leander, TX (US); Karl Milton Rister, Austin, TX (US); Andrew Matthew Theurer, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/190,069

(22) Filed: Aug. 12, 2008

(65) Prior Publication Data

US 2010/0042996 A1     Feb. 18, 2010

(51) Int. Cl.
*G06F 9/46* (2006.01)

(52) U.S. Cl. ........ 718/104; 713/300; 713/320; 713/340; 718/102

(58) Field of Classification Search .......... None
See application file for complete search history.

(56) References Cited

U.S. PATENT DOCUMENTS

| | | | |
|---|---|---|---|
| 4,907,150 A | | 3/1990 | Arroyo et al. |
| 5,021,983 A | | 6/1991 | Nguyen et al. |
| 5,167,024 A | * | 11/1992 | Smith et al. ................ 713/322 |
| 6,192,480 B1 | | 2/2001 | Barrus |
| 6,252,511 B1 | | 6/2001 | Mondshine et al. |
| 6,311,282 B1 | | 10/2001 | Nelson et al. |
| 6,684,341 B1 | | 1/2004 | Malcolm et al. |
| 2005/0050373 A1 | * | 3/2005 | Orenstien et al. ............. 713/320 |
| 2006/0123253 A1 | * | 6/2006 | Morgan et al. ................ 713/300 |
| 2007/0186121 A1 | * | 8/2007 | Yasuo ............................ 713/320 |
| 2009/0089782 A1 | * | 4/2009 | Johnson et al. ............... 718/100 |

* cited by examiner

*Primary Examiner* — Emerson Puente
*Assistant Examiner* — Sisley Kim
(74) *Attorney, Agent, or Firm* — Yee & Associates, P.C.; Steven L. Bennett

(57) ABSTRACT

Utilization management is provided. A utilization monitor is initiated to monitor a set of processes. Utilization data for an identified process of the set of processes is recorded to form recorded utilization data. It is determined whether the recorded utilization data exceeds a utilization threshold. In responsive to determining that the recorded utilization data exceeds a utilization threshold, an action is performed to manage utilization.

13 Claims, 5 Drawing Sheets

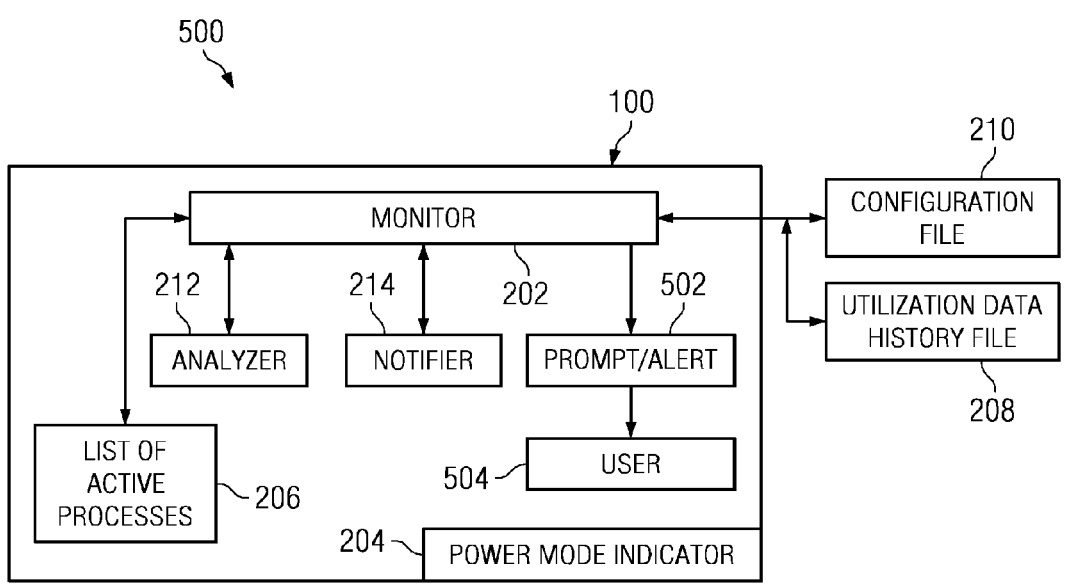

UTILIZATION MANAGEMENT

BACKGROUND OF THE INVENTION

1. Field of the Invention

The present invention relates generally to an improved data processing system, and, more specifically, to a computer implemented method, an apparatus, and a computer program product for utilization management.

2. Description of the Related Art

In many cases, applications on a typical computing device, such as a laptop computer, use very little processor capacity. Most of the application programs are user-driven, meaning the programs are active when the user is working with the application, and idle when not used. Occasionally, programs will not execute as desired and consume a large amount of processor resource. These programs may include email and messaging client programs.

Other programs that were installed inadvertently, or executed on a system, may use as much processor resource as possible. When these types of programs execute and consume as much of the processor resource as they can, battery life is adversely affected. In some cases, a user may not be aware of the fact that the program is running and consuming a significant amount of resource. For example, a virus scanning tool may be inadvertently started and left to run for several minutes, consuming much of the processor resource, while multiple threads scan memory and disk drives. This type of activity places a high drain on the battery of a battery-powered device.

More effective control over programs that consume large amounts of processor resource is required to minimize the impact of such programs. The need is more noticeable for battery-powered modes of operation.

BRIEF SUMMARY OF THE INVENTION

According to one embodiment of the present invention, a computer implemented method for utilization management is provided. The computer implemented method initiates a utilization monitor to monitor a set of processes, records utilization data for an identified process of the set of processes to form recorded utilization data, and determines whether the recorded utilization data exceeds a utilization threshold. The computer implemented method, responsive to a determination that the recorded utilization data exceeds a utilization threshold, performs an action to manage utilization.

In another embodiment, a data processing system for utilization management is provided. The data processing system comprises a bus, a memory connected to the bus, wherein the memory comprises computer-executable instructions, a communications unit, a processor unit, wherein the processor unit executes the computer-executable instructions to direct the data processing system to initiate a utilization monitor to monitor a set of processes, record utilization data for an identified process of the set of processes to form recorded utilization data, determine whether the recorded utilization data exceeds a utilization threshold, and responsive to a determination that the recorded utilization data exceeds a utilization threshold, perform an action to manage utilization.

In another embodiment, a computer program product for utilization management, the computer program product comprising computer-readable recordable type medium, tangibly embodies computer-executable instructions thereon. The computer-executable instructions comprise computer-executable instructions for initiating a utilization monitor to monitor a set of processes, computer-executable instructions for recording utilization data for an identified process of the set of processes to form recorded utilization data, computer-executable instructions for determining whether the recorded utilization data exceeds a utilization threshold, and computer-executable instructions, responsive to a determination that the recorded utilization data exceeds a utilization threshold, for performing an action to manage utilization.

BRIEF DESCRIPTION OF THE SEVERAL VIEWS OF THE DRAWINGS

FIG. 4 is a tabular representation of a list of resources, in accordance with illustrative embodiments;

FIG. 5 is a block diagram of a utilization management system, in accordance with illustrative embodiments;

DETAILED DESCRIPTION OF THE INVENTION

Figure 1:
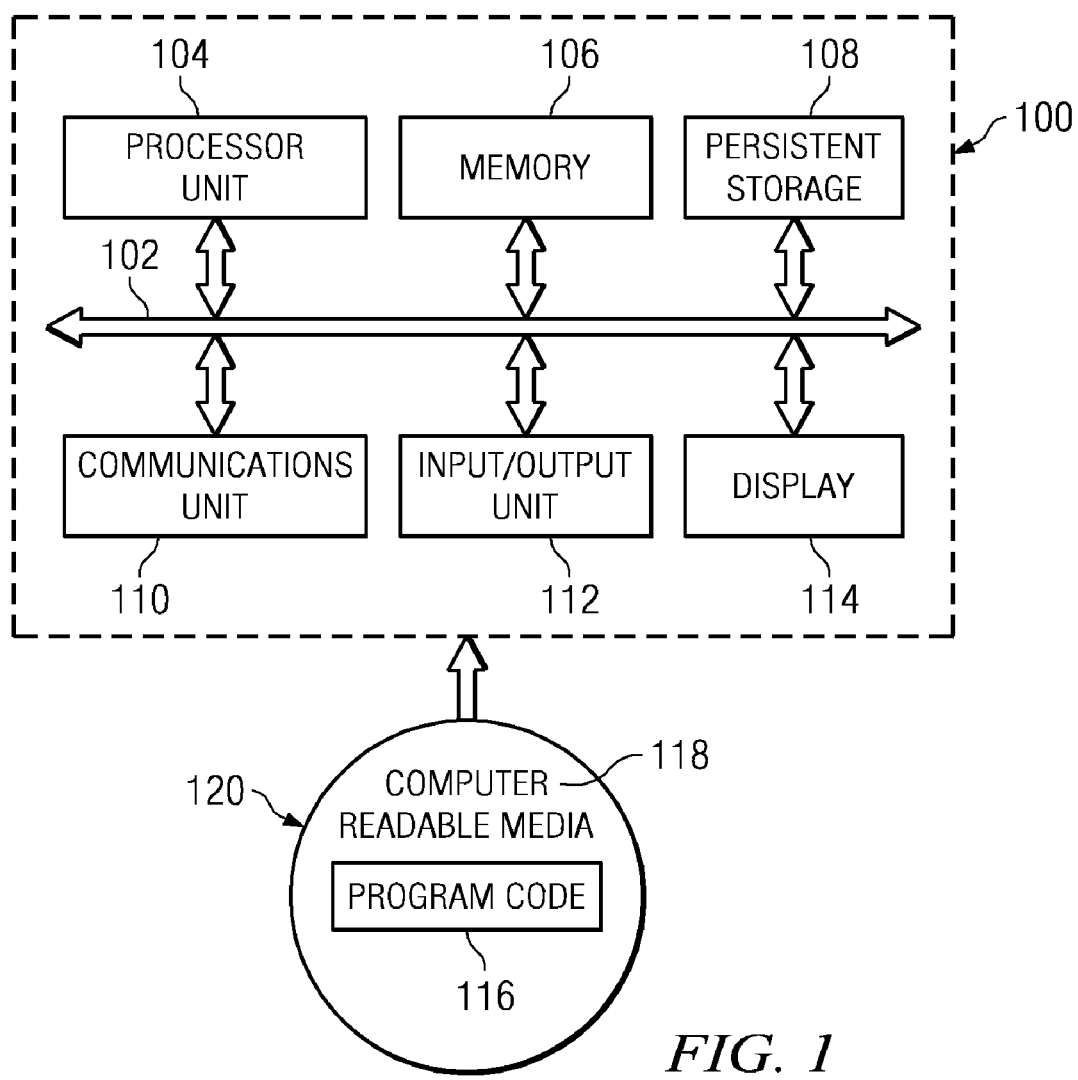
FIG. 1 is a block diagram of a data processing system, in which illustrative embodiments may be implemented.

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper, or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems), and computer program products, according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer, or other programmable data processing apparatus, to function in a particular manner, such that the instructions stored in the computer-readable medium produce an article of manufacture, including instruction means which implement the function/act specified in the flowchart and/or block diagram block or blocks.

The computer program instructions may also be loaded onto a computer, or other programmable data processing apparatus, to cause a series of operational steps to be performed on the computer, or other programmable apparatus, to produce a computer implemented process such that the instructions which execute on the computer, or other programmable apparatus, provide processes for implementing the functions/acts specified in the flowchart and/or block diagram block or blocks.

With reference now to the figures, and in particular with reference to FIG. 1, exemplary diagrams of data processing environments are provided, in which illustrative embodiments may be implemented. It should be appreciated that FIG. 1 is only exemplary and is not intended to assert or imply any limitation with regard to the environments in which different embodiments may be implemented. Many modifications to the depicted environments may be made.

With reference now to FIG. 1, a block diagram of a data processing system is shown, in which illustrative embodiments may be implemented. Data processing system 100 is an example of a computer, in which computer-usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors, or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices. A storage device is any piece of hardware that is capable of storing information, either on a temporary basis and/or a permanent basis. Memory 106, in these examples, may be, for example, a random access memory or any other suitable volatile or non-volatile storage device. Persistent storage 108 may take various forms, depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer-usable program code, or computer-readable program code that may be read and executed by a processor in processor unit 104. The program code in the different embodiments may be embodied on different physical or tangible computer-readable media, such as memory 106 or persistent storage 108.

Program code 116 is located in a functional form on computer-readable media 118 that is selectively removable and may be loaded onto, or transferred to, data processing system 100 for execution by processor unit 104. Program code 116 and computer-readable media 118 form computer program product 120 in these examples. In one example, computer-readable media 118 may be in a tangible form, such as, for example, an optical or magnetic disc that is inserted or placed into a drive, or other device that is part of persistent storage 108, for transfer onto a storage device, such as a hard drive that is part of persistent storage 108. In a tangible form, computer-readable media 118 also may take the form of a persistent storage, such as a hard drive, a thumb drive, or a flash memory that is connected to data processing system 100. The tangible form of computer-readable media 118 is also referred to as computer-recordable storage media. In some instances, computer-readable media 118 may not be removable.

Alternatively, program code 116 may be transferred to data processing system 100 from computer-readable media 118 through a communications link to communications unit 110, and/or through a connection to input/output unit 112. The communications link and/or the connection may be physical or wireless in the illustrative examples. The computer-readable media also may take the form of non-tangible media, such as communications links or wireless transmissions, containing the program code. The different components illustrated for data processing system 100 are not meant to provide architectural limitations to the manner in which different embodiments may be implemented. The different illustrative embodiments may be implemented in a data processing system, including components in addition to, or in place of, those illustrated for data processing system 100. Other components shown in FIG. 1 can be varied from the illustrative examples shown. As one example, a storage device in data processing system 100 is any hardware apparatus that may store data. Memory 106, persistent storage 108, and computer-readable media 118 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache such as found in an interface and memory controller hub that may be present in communications fabric 102.

An illustrative embodiment provides a utilization management capability within a data processing system, such as system 100 of FIG. 1. A utilization manager within memory 106 may be executed on processor 104 to monitor the processor utilization of active programs on system 100. Utilization statistics are captured, maintained and analyzed to determine and identify programs consuming large amounts of resource, such as, but not limited to, processor 104, on a regular basis. Once identified, the program is compared with a reference in a configuration file to determine what action to take. When the identified program is not found in the configuration file, a user may be prompted to add the identified program to the configuration file, and to select an action to be taken. When an action is selected, the action is performed on the identified program and the monitor returns to monitoring processor resource utilization again. Program and process may be used interchangeably in this description.

Figure 2:
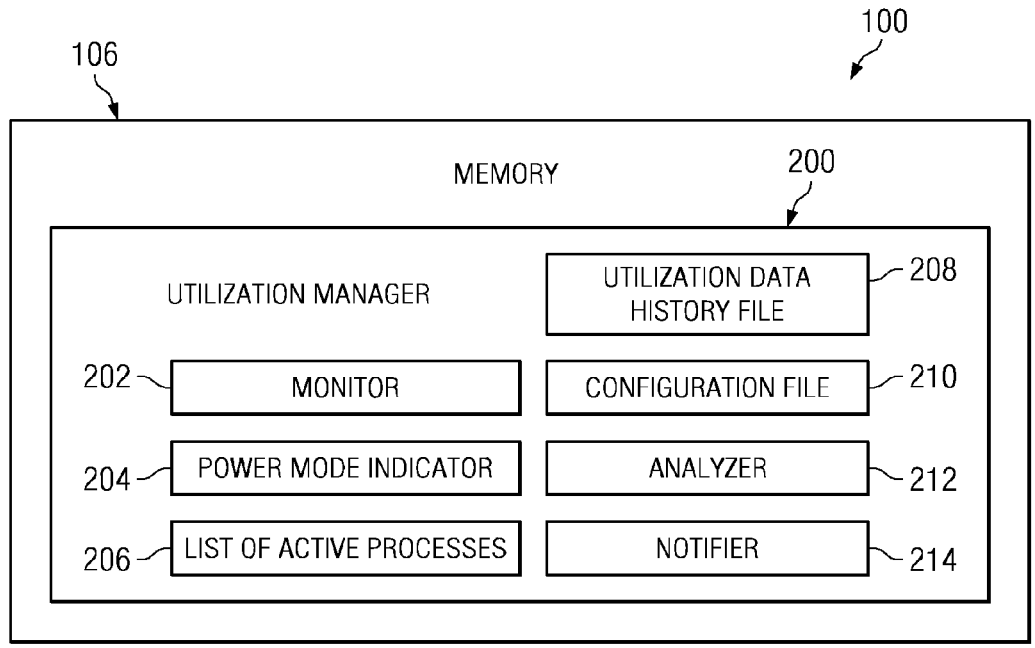
FIG. 2 is a block diagram of high-level components of a utilization manager, in accordance with illustrative embodiments.

With reference to FIG. 2, a block diagram of high-level components of a utilization manager, in accordance with illustrative embodiments, is shown. Utilization manager 200 is depicted within memory 106 of system 100 of FIG. 1. Utilization manager 200 may also be located in another suitable memory location, such as persistent storage 108, prior to use, or may installed using program code 116 from computer-readable media 118.

Utilization manager 200 contains a number of different components comprising monitor 202, power mode indicator 204, list of active processes 206, utilization data history file 208, configuration file 210, analyzer 212, and notifier 214. Monitor 202 provides a capability to maintain an awareness of specific areas of system 100. For example, when processor utilization is a consideration, monitor 202 monitors the utilization of the processor through system interfaces. Monitor 202 also performs the capture of utilization data for a monitored element, such as processor resource.

Power mode indicator 204 provides the current state of the power source for a system. The power source may be either a battery or alternating current. When in battery mode, monitor 202 is active, due to the power constraints of the battery power supply. When using an alternating current power source, monitor 202 need not be concerned with power drain by high-utilization programs.

List of active processes 206 is a system-maintained list of the currently executing, or recently executing, programs on the system being monitored. Monitor 202 reviews the programs in the list from the perspective of resource utilization in this example processor resource.

Utilization data history file 208 is a data structure that provides a capability to maintain a collection, or set, of utilization data. The utilization data may be collected for a specific program, type of program, or classification of program. For example, a program named payroll may be identified as a program instance to monitor, or a type of program defined as on-line may be used to track on-line processing systems, and a class of program using disk 123 may be monitored and have data collected. Utilization data may include resource measurements for resources such as processor, memory or disk space. The units of measurement are appropriate for the resource being monitored and measured. For example, processor utilization may be measured as a percentage of the processor being used or as a timed amount of usage.

Configuration file 210 is another data structure containing information defining actions to take when a defined program being monitored exceeds a predetermined threshold value. Actions listed for a specific matching program name, type, or class may then be taken without user intervention. For example, when a monitored program exceeds a predetermined threshold of processor usage, an established action for the specific event cancels the program. In another example, for similar high processor utilization, another program may be allowed to continue because the program is expected to use a large amount of processor cycles. The configuration file is thus primed with event and action associations for specified programs or processes. In an example of classification, an action of "ignore" may be set for the classification of system scanning tools, such as a virus scanner, as all such scanners consume large amounts of processor cycles as a normal course of performing the task.

Actions typically are selected from a group of choices, such as cancel, ignore, suspend, and notify to allow a response to be tailored to a preferred outcome. Types of resources to monitor may include programs, processes, input output devices, memory, communication devices, and other resources that provide usage information, or allow such information to be collected. Specialized input by way of hardware or software probes may also allow data to be collected for some resources.

Analyzer 212 reviews the utilization data collected by monitor 202 and stored in history file 208 for comparison with current utilization values for a specific program name, type, or class. Analyzer 212 determines whether a predetermined threshold value is exceeded. When the threshold in configuration file 210 for a specified program is exceeded, analyzer 212 initiates the action defined in configuration file 210.

Notifier 214 provides a notification capability to provide an alert message, indication, or a prompt, to a user of system 100. For example, based on the output of analyzer 212, and a program entry not being found in utilization data history file 208, a user may receive a prompt for input from notifier 214 requesting a selection of an action to perform, including addition of the program to utilization data history file 208. Notifier 214 typically interfaces with an existing user interface component to provide message and prompting capabilities.

Figure 3:
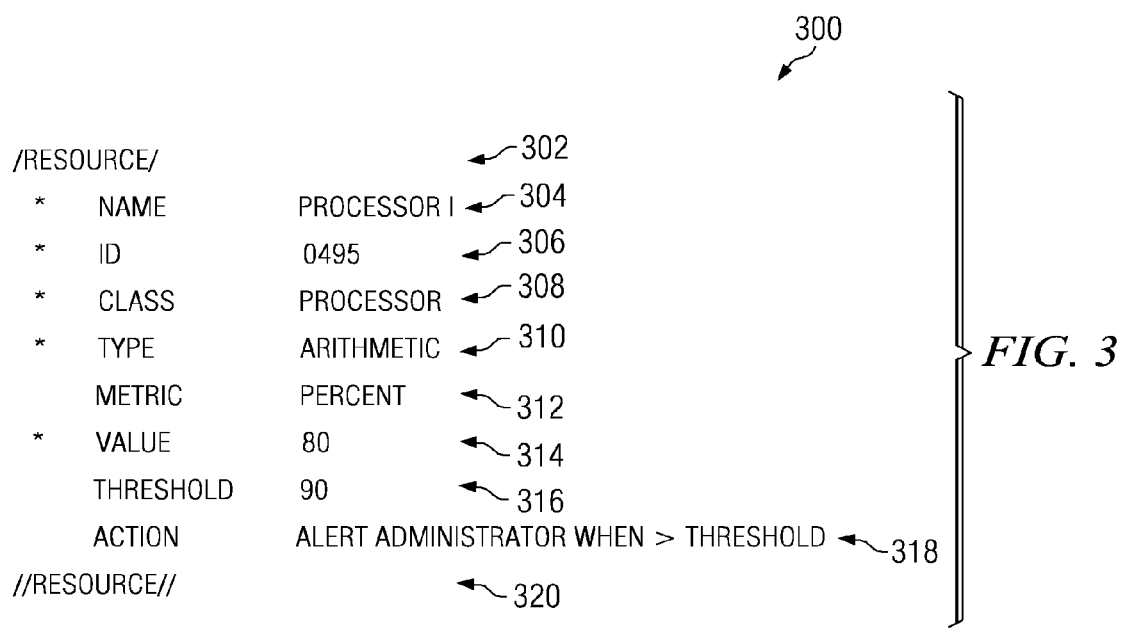
FIG. 3 is a text representation of a resource entry in a configuration file, in accordance with an illustrative embodiment.

With reference to FIG. 3, a text representation of a resource entry in a configuration file is shown, in accordance with an illustrative embodiment. Resource entry 300 of configuration file 210 of FIG. 2 comprises a number of elements describing attributes of the resource entry. Resource 302 and resource 320 define the start and stop statements of resource entry 300. Between these two statements may be found the information describing the entry.

Name 304 defines the name by which the entry is known, in this case processor 1 Id 306 provides an identifier that is used by the system or by the monitoring function. Class 308 defines the classification into which the resource entry is allocated, such as processor or disk. Type 310 is another mechanism to collect similar resources for monitoring and reporting purposes. In this case, the type is specified as arithmetic to denote an arithmetic processor rather than a graphic or other special purpose unit.

Metric 312 indicates the units of measure for a resource consuming entry. In this example, percent indicates the utilization is tracked by percentage of total resource. Value 314 indicates a normal utilization while threshold 316 indicates an event watermark. Action 318 will be taken when threshold 316 is exceeded.

For entries where a resource may consume more than one type of resource, such as program consumes processor and memory resources, the entry would be repeated to define the multiple resources consumed, including actions for each specific resource consumed.

Entries of 304-310 and 314 will also be found in utilization data history file 208. For example, the actual values of the attributes may be placed in the file as a series of comma-separated values for a respective resource. A difference is in utilization data history file 208; a "value" entry would be the actual value from the system. The utilization value may be an aggregated value or may be an averaged or instantaneous value, as desired for the resource being monitored. In another embodiment, utilization data history file 208 may be maintained as a database table.

With reference to FIG. 4, a tabular representation of a list of resources is shown, in accordance with illustrative embodiments. Table 400 provides a set of information as may be determined from a system call for the presentation of resource statistics in a user interface. Typically, a similar command allows for the collection of the displayed information into a file for subsequent processing. A set of tabs across the top of the table indicates program 402, task 404, device 406 and class 408 as possible viewing choices.

Program 402 is a tab currently on top displaying information for the currently loaded programs. Task 404 is a tab for accessing information similar to program information. Device 406 provides access to a tabular view of device utilization statistics that typically displays usage as a percentage of filled or used space and free space compared with total space. Class 408 indicates resource utilization by class, such as processor, memory, and disk storage.

Returning to program 402, row 410 depicts name, processor and memory labels or legend. Name indicates the name of the program. Processor indicates the processor consumption of the program as a percentage of the total processor available. Memory indicates the usage of available system memory in appropriate units, such as bytes.

Row 412 provides a sample of information for a program named "payroll" having a processor utilization value of 25 and a memory usage of 1350. The utilization data captured for the program is used to determine an action to be taken when an event occurs during a monitoring cycle.

With reference to FIG. 5, a block diagram of a utilization management system, in accordance with illustrative embodiments, is shown. Utilization management system 500 depicts an example of the relationship between components of utilization manager 200 of FIG. 2 implemented within system 100 of FIG. 1. In the example shown, monitor 202 determines whether to monitor utilization by identifying when power mode indicator 204 is in battery mode. When in battery mode, monitor 202 accesses and monitors programs found in list of active processes 206. Monitoring may be a default setting in a system configuration file, typically used to start programs on system startup, or may be initiated by a user. Utilization data is collected for monitored programs and placed in utilization data history file 208. Analyzer 212 may then compare the current utilization of a specific program with a previous set of data for the specific program in utilization data history file 208, or just review the previous information to determine a trend. If there is no corresponding entry in utilization data history file 208, an entry may be created.

When analyzer 212 determines a utilization threshold has been exceeded for a specific program, an entry in configuration file 210 will be located that specifies an action to take. When no entry can be found, user 504 receives a prompt/alert 502 from notifier 214.

Figure 6:
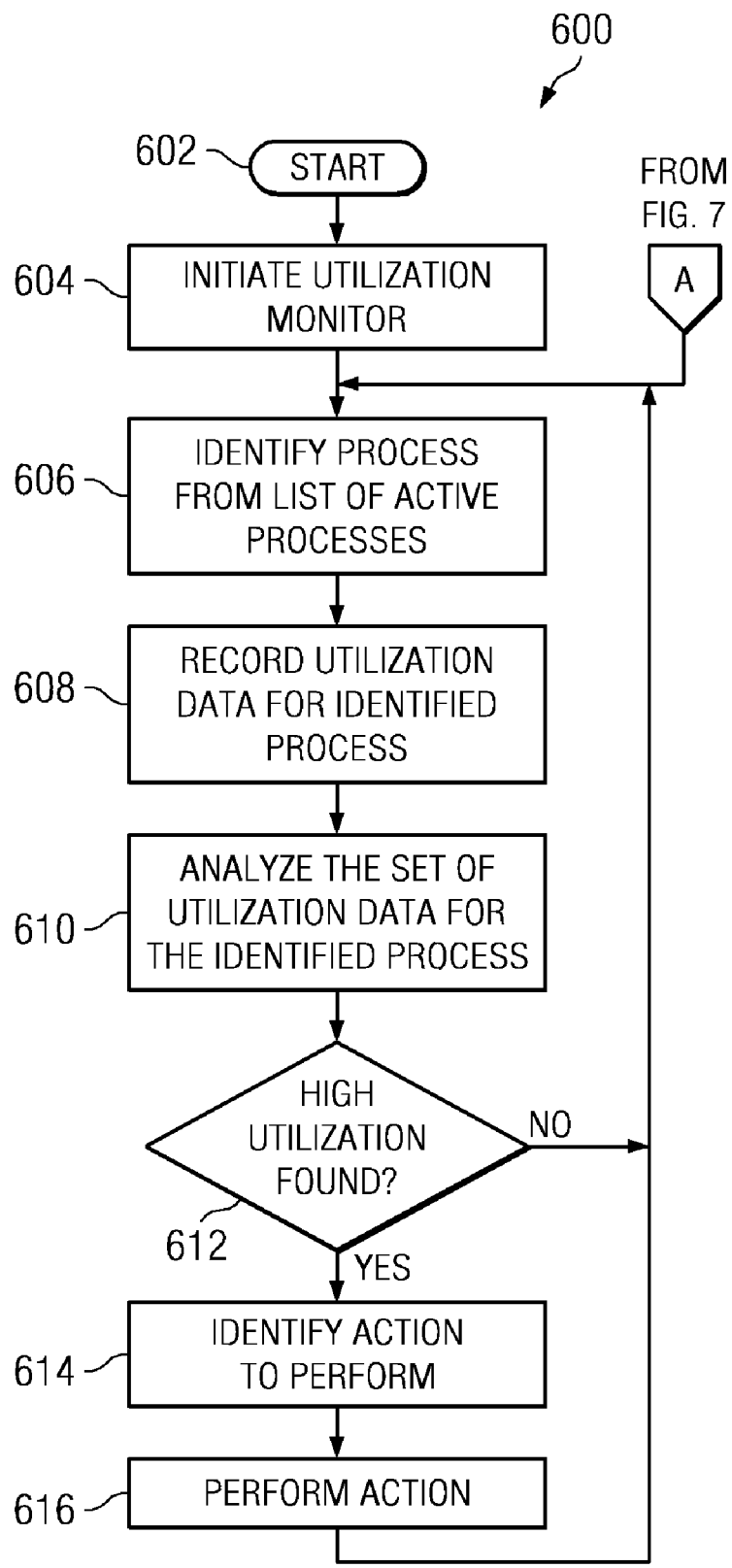
FIG. 6 is a flowchart of a process using the utilization manager of FIG. 2, in accordance with illustrative embodiments.

With reference now to FIG. 6, a flowchart of a process using the utilization manager of FIG. 2, in accordance with illustrative embodiments, is shown. Process 600 is an example of a utilization management process using utilization manager 200 of FIG. 2. Process 600 starts (step 602) and initiates utilization monitor (step 604). The monitoring may be started programmatically at system startup, or on demand by user intervention. A power mode indicator, indicating the power source is in battery mode, also typically determines monitoring. Typically, when powered through a line cord, battery life is not a concern and the need for monitoring resource usage that may cause a battery to be exhausted is not required.

Identify process from list of active processes is performed to select processes to be monitored and have utilization data captured (step 606). Identified processes are typically the processes having high resource utilization. In the examples provided, the resource utilization focused on processor resources, but may be altered to choose other resource consumption. For example, in an operating system environment, a system command may be issued to provide a listing of the currently loaded programs or tasks. Some of the programs may be active and consuming resources, thereby generating utilization statistics. Programming interfaces provide access to this type of utilization information.

Record utilization data for identified process records the utilization data associated with the process (step 608). The recorded utilization information is stored in a utilization data history file, or other form of persistent storage. Utilization data is collected for the specific program name, type, or class of program to form a collection, or set, of utilization data or values. For example, a system command may be issued at predetermined intervals to identify what tasks are running and the usage information related to the tasks. The identity of the active tasks and the associated usage information may then be written out to a persistent data area to accumulate the information. Once accumulated, the data can be aggregated and analyzed. Rather than presenting the instantaneous information on a display, the information is captured for further analysis and reporting.

Analyze the set of utilization data comprising values for the identified process is performed (step 610). Analysis is performed to review the current utilization with respect to the corresponding stored information, or only the stored information. Analyzing the stored information may indicate a trend of usage. Analyzing a current value with respect to a predetermined value or threshold may also be performed.

A determination is made, after the analysis, as to whether high utilization of the specific resource has been found (step 612). When high utilization is determined, a "yes" result is obtained. When high utilization is not evident, a "no" determination is made. When a "no" result is obtained in step 612, process 600 loops back to step 606.

When a "yes" is obtained in step 612, identify action to perform occurs (step 614). The action to be performed may be determined from a configuration file containing a corresponding entry for the specific process analyzed, or received in response to a user prompt. Perform action executes the selected action from among a set of actions for the specific process (step 616), and process 600 loops back to step 606.

Figure 7:
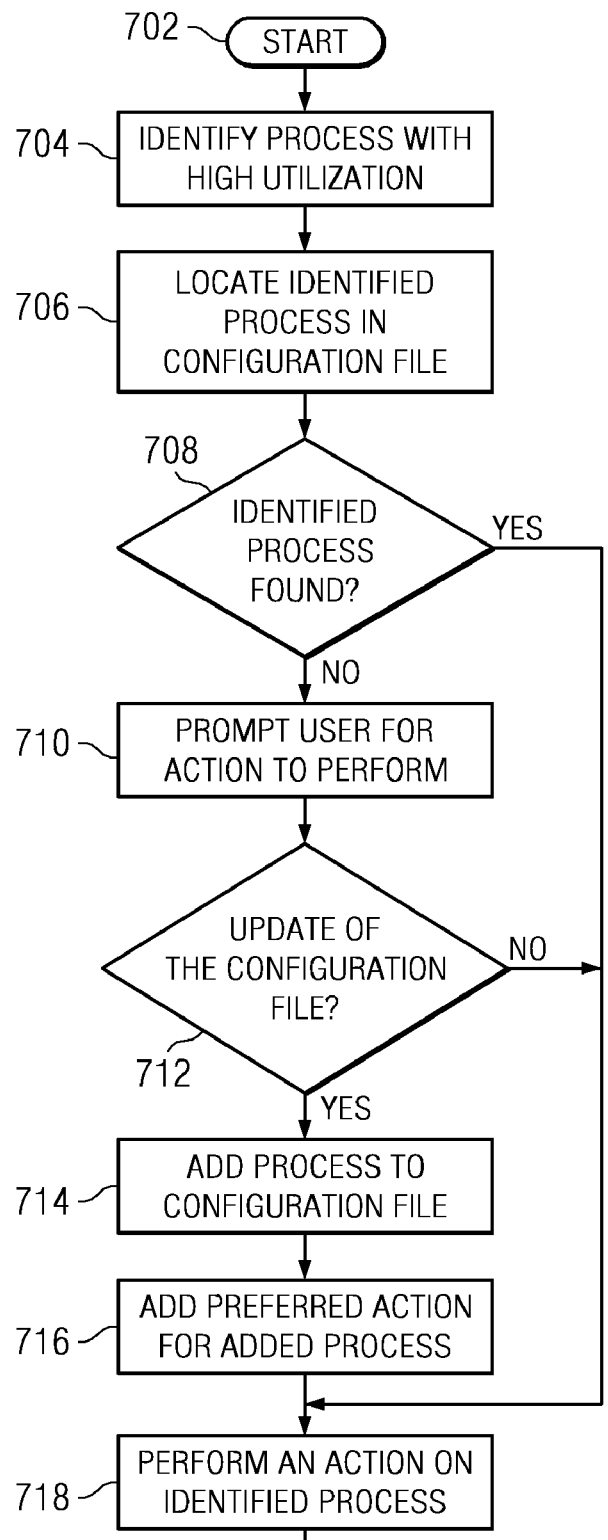
FIG. 7 is a flowchart of an action determination process within the utilization management process of FIG. 6, in accordance with illustrative embodiments.

With reference to FIG. 7, a flowchart of an action determination process within the utilization management process of FIG. 6 is shown, in accordance with illustrative embodiments. Process 700 is an example of an action determination process within an identify action to perform step 614 of process 600 of FIG. 6. Process 700 starts (step 702), followed by identify a process with high utilization (step 704). Identification is based on the system-generated list of processes with associated utilization. For example, an operating system may provide a system call to create a list of applications and processes with associated utilization of system resources, such as processor utilization or memory utilization.

Having identified a process from the list with a high utilization, an attempt is made to locate the identified process in the configuration file (step 706). A determination is made as to whether the identified process is found in the configuration file (step 708). When the process is found, a "yes" result is obtained. When the process cannot be located, a "no" result is obtained. When a "yes" is obtained in step 708, process 700 skips to perform an action on the identified process (step 718).

When a "no" is obtained in step 708, prompt user for action to perform is issued (step 710). The response, containing a selected action, is checked to determine whether an update of the configuration file is desired (step 712). If an update is desired, a "yes" result is obtained. If an update to the configuration file is not desired, a "no" result is obtained. When a "no" is obtained in step 712, process 700 performs an action on the identified process (step 718) as before.

When a "yes" is obtained in step 712, an add process to configuration file is performed to add the identified process as an entry in the configuration file (step 714). Along with the process identifier may be specified a preferred action to be performed for the added process (step 716). The action will be taken when utilization exceeds a predetermined value or threshold. The action can then be taken without user intervention. An action is performed on identified process (step 718) then process 700 loops back to step 606 of FIG. 6.

Illustrative embodiments provide a capability to uniquely identify high resource-consuming processes, as well as when a power mode indicates a power-constrained environment, such as when battery-powered, take action to reduce the power drain. Action occurs by matching an identified high-utilization process with an entry in a configuration file, wherein the entry specifies an action to take without user intervention. When a matching entry cannot be found, a user may be prompted to add an entry to the configuration file, as well as select an action to perform. Comparison may be performed against utilization data collected from previous use of the process stored in a utilization data history file. The utilization data history file is a data structure suitable for containing sets of data associated with a process collected over time. The data may be used in trend analysis or direct comparison with a current utilization. A comparison may also occur between a current utilization value and a predetermined threshold value.

The flowchart and block diagrams in the Figures illustrate the architecture, functionality, and operation of possible implementations of systems, methods, and computer program products, according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skill in the art, without departing from the scope and spirit of the invention. The embodiment was chosen and described in order to best explain the principles of the invention, the practical application, and to enable others of ordinary skill in the art to understand the invention for various embodiments, with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with, a computer or any instruction execution system. For the purposes of this description, a computer-usable or computer-readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output, or I/O devices, (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments, with various modifications as are suited to the particular use contemplated.

What is claimed is:

1. A computer implemented method for utilization management, the computer implemented method comprising:
    determining, by a data processing system, whether a power module indicator indicates that the data processing system is in a battery mode of operation;
    responsive to a determination by the data processing system that the power module indicator does not indicate that the data processing system is in the battery mode of operation, deactivating, by the data processing system, monitoring of a utilization monitor monitoring a set of processes;
    responsive to a determination by the data processing system that the power module indicator does indicate that the data processing system is in the battery mode of operation, activating, by the data processing system, the monitoring of the utilization monitor monitoring the set of processes;
    issuing, by the data processing system, a system command at predetermined intervals to identify the set of processes running on the data processing system;
    identifying, by the data processing system, a process of the set of processes to form an identified process;
    recording, by the data processing system, utilization data for the identified process of the set of processes provided by the utilization monitor after activation to form recorded utilization data for the identified process;
    determining, by the data processing system, whether the recorded utilization data for the identified process exceeds a utilization threshold value;
    responsive to a determination by the data processing system that the recorded utilization data for the identified process exceeds the utilization threshold value, determining, by the data processing system, whether the identified process is located in a configuration file that defines actions to take without user intervention when the identified process exceeds the utilization threshold value; and
    responsive to a determination by the data processing system that the recorded utilization data for the identified process exceeds the utilization threshold value and the identified process is not located in the configuration file, sending, by the data processing system, an alert message prompting a user for an action to perform on the identified process, determining whether an update to the configuration file is desired, adding an entry for the identified process to the configuration file in response to a determination by the data processing system that an update to the configuration file is desired, adding a preferred action to the entry of the identified process, and performing the preferred action on the identified process.

2. The computer implemented method of claim 1, wherein the identified process of the set of processes is identified from a list of active processes running on the data processing system.

3. The computer implemented method of claim 1 further comprises:
    analyzing, by the data processing system, the recorded utilization data for the identified process.

4. The computer implemented method of claim 1 further comprises:
    identifying, by the data processing system, an action to perform from a set of actions.

5. The computer implemented method of claim 1, wherein the utilization monitor monitors system memory usage by the set of processes using a threshold value corresponding to the system memory usage by the set of processes as the utilization threshold value.

6. A data processing system for utilization management, the data processing system comprising:
    a bus;
    a memory connected to the bus, wherein the memory stores computer-executable instructions;
    a communications unit, connected to the bus;
    a processor unit connected to the bus, wherein the processor unit executes the computer-executable instructions to direct the data processing system to:
    determine whether a power module indicator indicates that the data processing system is in a battery mode of operation;
    deactivate monitoring of a utilization monitor monitoring a set of processes in response to a determination that the power module indicator does not indicate that the data processing system is in the battery mode of operation;

activate the monitoring of the utilization monitor monitoring the set of processes in response to a determination that the power module indicator does indicate that the data processing system is in the battery mode of operation;

issue a system command at predetermined intervals to identify the set of processes running on the data processing system;

identify a process of the set of processes to form an identified process; record utilization data for the identified process of the set of processes provided by the utilization monitor after activation to form recorded utilization data for the identified process;

determine whether the recorded utilization data for the identified process exceeds a utilization threshold value;

determine whether the identified process is located in a configuration file that defines actions to take without user intervention when the identified process exceeds the utilization threshold value in response to a determination that the recorded utilization data for the identified process exceeds the utilization threshold value; and send an alert message prompting a user for an action to perform on the identified process, determine whether an update to the configuration file is desired, add an entry for the identified process to the configuration file when an update to the configuration file is desired, add a preferred action to the entry of the identified process, and perform the preferred action on the identified process in response to a determination that the recorded utilization data for the identified process exceeds the utilization threshold value and the identified process is not located in the configuration file.

7. The data processing system of claim 6, wherein the processor unit executes the computer-executable instructions to direct the data processing system to:

identify the identified process of the set of processes from a list of active processes running on the data processing system.

8. The data processing system of claim 6, wherein the processor unit executes the computer-executable instructions to direct the data processing system to:

analyze the recorded utilization data for the identified process.

9. The data processing system of claim 6, wherein the processor unit executes the computer-executable instructions to direct the data processing system to:

identify an action to perform from a set of actions.

10. A computer program product stored on a computer readable storage device having computer-executable instructions embodied thereon that are executable by a computer for utilization management, the computer program product comprising:

computer-executable instructions for determining whether a power module indicator indicates that the computer is in a battery mode of operation;

computer-executable instructions, responsive to a determination that the power module indicator does not indicate that the computer is in the battery mode of operation, for deactivating monitoring of a utilization monitor monitoring a set of processes;

computer-executable instructions, responsive to a determination that the power module indicator does indicate that the computer is in the battery mode of operation, for activating the monitoring of the utilization monitor monitoring the set of processes;

computer-executable instructions for issuing a system command at predetermined intervals to identify the set of processes running on the computer;

computer-executable instructions for identifying a process of the set of processes to form an identified process;

computer-executable instructions for recording utilization data for the identified process of the set of processes provided by the utilization monitor after activation to form recorded utilization data for the identified process;

computer-executable instructions for determining whether the recorded utilization data for the identified process exceeds a utilization threshold value;

computer-executable instructions, responsive to a determination that the recorded utilization data for the identified process exceeds the utilization threshold value, for determining whether the identified process is located in a configuration file that defines actions to take without user intervention when the identified process exceeds the utilization threshold value; and computer-executable instructions, responsive to a determination that the recorded utilization data for the identified process exceeds the utilization threshold value and the identified process is not located in the configuration file, for sending an alert message prompting a user for an action to perform on the identified process, determining whether an update to the configuration file is desired, adding an entry for the identified process to the configuration file in response to a determination that an update to the configuration file is desired, adding a preferred action to the entry of the identified process, and performing the preferred action on the identified process.

11. The computer program product of claim 10, wherein the identified process of the set of processes is identified from a list of active processes running on the computer.

12. The computer program product of claim 10 further comprises:

computer-executable instructions for analyzing the recorded utilization data for the identified process.

13. The computer program product of claim 10 further comprises:

computer-executable instructions for identifying an action to perform from a set of actions.

* * * * *